United States Patent
Torimoto et al.

(10) Patent No.: US 7,411,550 B2
(45) Date of Patent: Aug. 12, 2008

(54) SYSTEM FOR TRANSMITTING POSITIONING SIGNAL

(75) Inventors: Hideyuki Torimoto, Tokyo (JP); Ivan Petrovski, Tokyo (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/480,797

(22) Filed: Jul. 3, 2006

(65) Prior Publication Data

US 2007/0096985 A1 May 3, 2007

(30) Foreign Application Priority Data

Jul. 5, 2005 (JP) .............................. 2005-196323

(51) Int. Cl.
*G01S 3/02* (2006.01)
(52) U.S. Cl. .................. 342/453; 342/357.09; 342/463
(58) Field of Classification Search ................ 342/453, 342/463–465, 357.09; 701/207, 213
See application file for complete search history.

(56) References Cited

U.S. PATENT DOCUMENTS

2003/0232595 A1 12/2003 Baker et al.

2004/0257276 A1 12/2004 Huston et al.

FOREIGN PATENT DOCUMENTS

EP 0844492 5/1998
WO WO-2004/081600 9/2004

OTHER PUBLICATIONS

EPO Communication regarding EP Application No. 06013648.8—1248, dated Oct. 18, 2006, with Extended European Search Report (EESR) (6 pages).
Nagle, J. R., et al.: "Geostationary Repeaters: A Low Cost Way to Enhance Civil User Performance of GPS and Glonass"; The 1990's—A Decade of Excellence In The Navigation Sciences; Las Vegas, Mar. 20-23, 1990; Proceedings Of The Position Location And Navigation Symposium (PLANS), IEEE, New York, U.S.; pp. 9-16 (9 pages).

*Primary Examiner*—Dao L Phan
(74) *Attorney, Agent, or Firm*—Osha Liang LLP

(57) ABSTRACT

A system for transmitting time-synchronized signals for positioning is provided. The system for transmitting positioning signals includes a transmitting apparatus mounted on artificial satellite, a repeater mounted on an artificial satellite, and a repeater mounted on an artificial satellite. Positional relation among artificial satellites is specified beforehand. Transmitting apparatus transmits a signal generated by encoding using a code identifying itself. Repeater receives a signal from the transmitting apparatus and transmits the signal. Repeater receives a signal from the transmitting apparatus and transmits the signal. The signals transmitted from the transmitting apparatus and repeaters and are received by receiving apparatuses and having the function of receiving the signals.

16 Claims, 14 Drawing Sheets

SYSTEM FOR TRANSMITTING POSITIONING SIGNAL

BACKGROUND OF THE INVENTION

1. Field of the Invention

The present invention relates to a technique for transmitting a signal for positioning. More specifically, the present invention relates to system for transmitting synchronized signals for positioning.

2. Description of the Background Art

A method of positioning using a signal transmitted from a satellite has been known. By way of example, a GPS (Global Positioning System) signal transmitted from a GPS satellite is used for positioning. More specifically, an apparatus receiving GPS signals transmitted from three or more GPS satellites read data contained in each of the signals, executes a predetermined operation, and calculates positional information. Here, accuracy of time data contained in the data determines the accuracy of positional information, and therefore, a high-precision clock (for example, an atomic clock) is mounted on each GPS satellite. It is noted that the clocks must be synchronized with each other. Therefore, in order to maintain synchronization between each of the clocks mounted on GPS satellites, sometimes it becomes necessary to correct time of a clock on a satellite using time information of a master clock provided on the ground.

A system enabling positioning based on satellite signals, that is, a so-called satellite positioning system may include, in addition to GPS operated by the United States of America as mentioned above, Galileo of which operation is under consideration of the European Union, GLONASS (Global Navigation Satellite System) operated by the Russian Federation and the like.

In the foregoing, conventional art related to the present invention has been described based on general technical information known to the applicant. To the best of applicant's memory, the applicant does not have any information to be disclosed as prior art, before the filing of this application.

When positional information is to be calculated using radio signals as described above, the following problems arise. As it is necessary to mount a high-precision clock on each satellite or a ground-based transmitter as a pseudolite, the cost for building a system for transmitting positioning signals increases.

SUMMARY OF THE INVENTION

The present invention was made to solve the above described problems, and its object is to provide a system for transmitting synchronized signals for positioning.

Another object of the present invention is to provide a system for transmitting synchronized signals for positioning using one clock in the system.

In order to attain the above described objects, according to an aspect, the present invention provides a system for transmitting a positioning signal to a receiving apparatus receiving the positioning signal for positioning the receiving apparatus. The system includes one transmitting apparatus transmitting the positioning signal. The one transmitting apparatus includes time keeping means for keeping time, storing means for storing data as an object to be encoded, generating means for generating the positioning signal containing the time, by encoding data stored in the storing means, using a code for identifying a transmission apparatus of the positioning signal, and transmitting means for transmitting the positioning signal generated by the generating means. The system further includes a plurality of relay apparatuses relaying the positioning signal, and supplying means for supplying data specifying positional relation between the transmitting apparatus and each of the plurality of relay apparatuses to the receiving apparatus. Each of the plurality of relay apparatuses includes receiving means for receiving the signal transmitted from the transmitting apparatus, and transmitting means for transmitting the signal received by the receiving means.

Preferably, the supplying means includes output means for outputting the data specifying the positional relation to the generating means.

Preferably, the supplying means includes transmitting means for transmitting the data specifying the positional relation through a path different from a communication path of the transmitting apparatus.

Preferably, the transmitting apparatus and each of the plurality of relay apparatuses are mounted on each of a plurality of artificial satellites.

Preferably, at least one of the plurality of artificial satellites stays space above a predetermined region.

Preferably, each of the artificial satellites navigates maintaining a predetermined positional relation between each of the plurality of artificial satellites.

Preferably, the generating means generates the positioning signal by encoding using a code for identifying an artificial satellite on which the transmitting apparatus is mounted.

Preferably, the time keeping means is an atomic clock.

Preferably, the transmitting means of the transmitting apparatus transmits the positioning signal by wireless. The receiving means of the relay receives the positioning signal by wireless.

Preferably, the generating means of the transmitting apparatus generates the positioning signal by encoding based on spread spectrum system.

Preferably, the signal generated by encoding has a period between one millisecond and one week.

Preferably, the signal generated by encoding has a period between one second and one hour.

Preferably, the signal generated by encoding has a period of at least one minute and within a predetermined tolerable range.

Preferably, the transmitting means of the relay transmits the signal without changing contents of the signal received by the receiving means.

Preferably, the transmitting means of the relay transmits the signal without changing time contained in the signal received by the receiving means.

Preferably, the transmitting apparatus further includes receiving means receiving input of data as an object to be encoded.

Preferably, the data as an object to be encoded includes data for specifying position of the transmitting apparatus. Preferably the data can be transmitted by separate channels.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
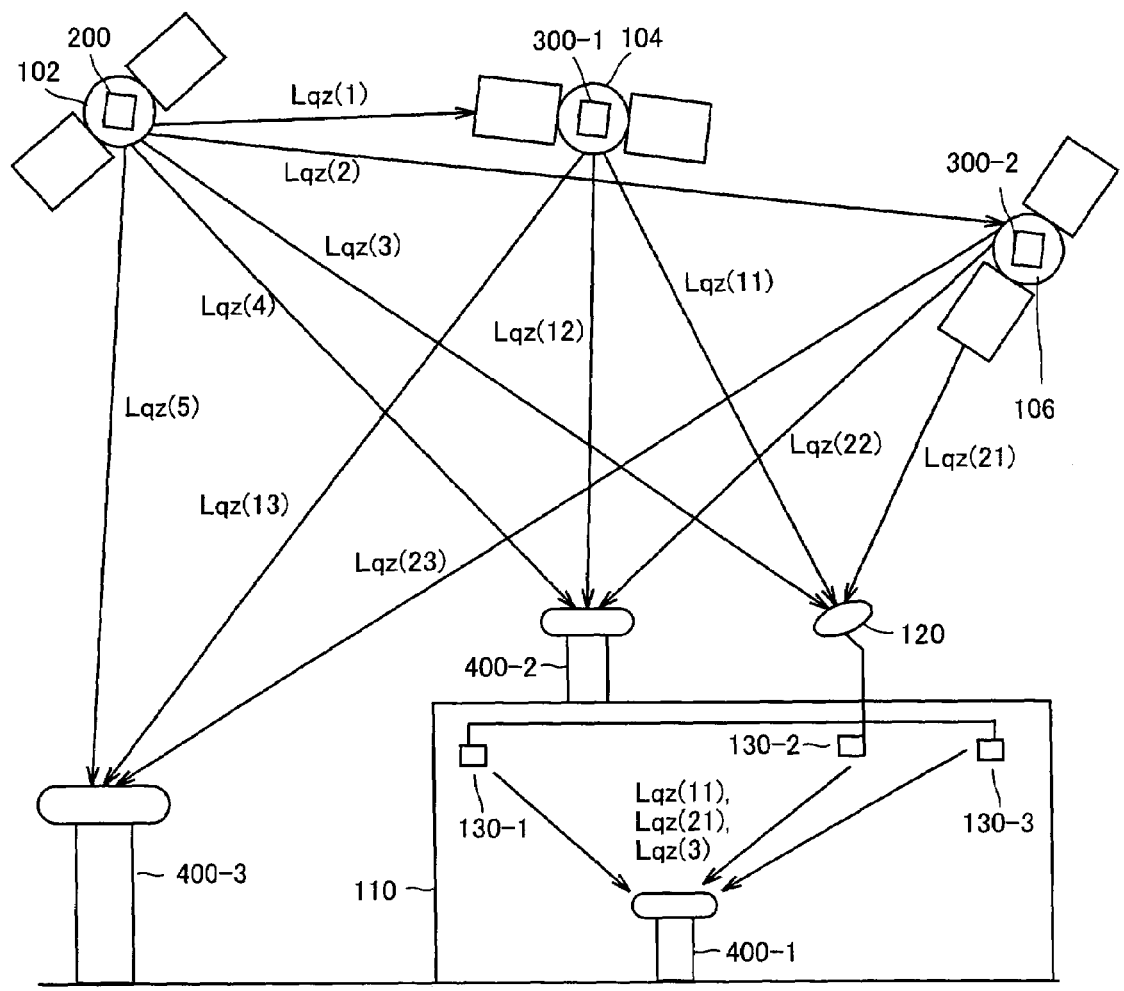
FIG. 1 is a schematic diagram representing a configuration of a system transmitting a signal for positioning in accordance with a first embodiment of the present invention.

In the following, embodiments of the present invention will be described with reference to figures. In the following description, same portions are denoted by the same reference characters. They have the same names and functions. Therefore, detailed description thereof will not be repeated.

Referring to FIG. 1, a system for transmitting a signal for positioning (hereinafter referred to as a positioning signal) in accordance with an embodiment of the present invention will be described. FIG. 1 schematically shows the system's configuration. Here in below for ease of description, terminologies used for a GPS signal are used for illustration. The positioning signal, however, is not limited to the GPS signal.

The system includes a transmitting apparatus 200 mounted on an artificial satellite 102, a repeater 300-1 mounted on an artificial satellite 104, and a repeater 300-2 mounted on an artificial satellite 106. Positional relation between each of artificial satellites 102, 104 and 106 is specified beforehand. By way of example, the data representing the positional relation is formed in advance at a base station on the ground that monitors each artificial satellite. Here, the data may have, for example, date and time related to the position at which each satellite navigates. The data may be a navigation message including orbit information (or ephemeris) used in the so-called GPS system.

Here, artificial satellites 102, 104 and 106 are, for example, communication satellites, and they may be other satellites. For instance, they may be satellites that constitute the quasi-zenith system presently contemplated in Japan. At least one of the satellites constituting this system navigates to be seen near the zenith in Japan at any time, and therefore, the signal from the satellite navigating near the zenith can readily be received even at an urban area where a large number of tall buildings stand. If any other system similar to the quasi-zenith system is implemented in other country, the satellites may be the ones that constitute the corresponding system.

Transmitting apparatus 200 transmits signals generated by encoding, using a code for identifying itself Specifically, transmitting apparatus 200 transmits signals Lqz(1), Lqz(2), Lqz(3), Lqz(4) and Lqz(5). Frame structures of these signals will be described in detail with reference to FIG. 5.

Repeater 300-1 receives the signal Lqz(1) transmitted from transmitting apparatus 200, amplifies the signal and transmits the result with higher transmission output. Specifically, repeater 300-1 transmits signals Lqz(11), Lqz(12) and Lqz(13), respectively. Here, the signal Lqz(1) contains data for calculating position such as time information or navigation message, as will be described later, and such data are unchanged. The transmitted signals are received by receiving apparatuses 400-2, 400-3 or an antenna 120 having a function of receiving the signals.

Repeater 300-2 receives the signal Lqz(2) transmitted from transmitting apparatus 200, amplifies the signal and transmits the result with higher transmission output. Specifically, repeater 300-1 transmits signals Lqz(21), Lqz(22) and Lqz(23), respectively. Similar to the signals transmitted from repeater 300-1, the signals transmitted from repeater 300-2 are also received by a receiving apparatus having the receiving function. Though two repeaters are shown in FIG. 1, the number of repeaters forming the system of the present invention may be at least two. Preferably, the system includes three repeaters.

Referring again to FIG. 1, on the ground, receiving apparatuses 400-2 and 400-3 are provided. Receiving apparatus 400-2 is installed on a roof of a building 110, and is capable of receiving signals transmitted from artificial satellites 102, 104 and 106, respectively. Further, antenna 120 is on a building 112. Antenna 120 is capable of receiving signals transmitted from artificial satellites 102, 104 and 106. Antenna 120 receives signals Lqz(3), Lqz(11) and Lqz(21). The received signals are transferred to relay apparatuses 130-1, 130-2, and 130-3 through a cable. More apparatuses may be implemented in the building 110. Each of the relay apparatuses 130-1, 130-2, 130-3 transmits the signals to the inside of building 110. Receiving apparatus 400-1 is capable of receiving signals Lqz(11), Lqz(21) and Lqz(3).

Figure 2:
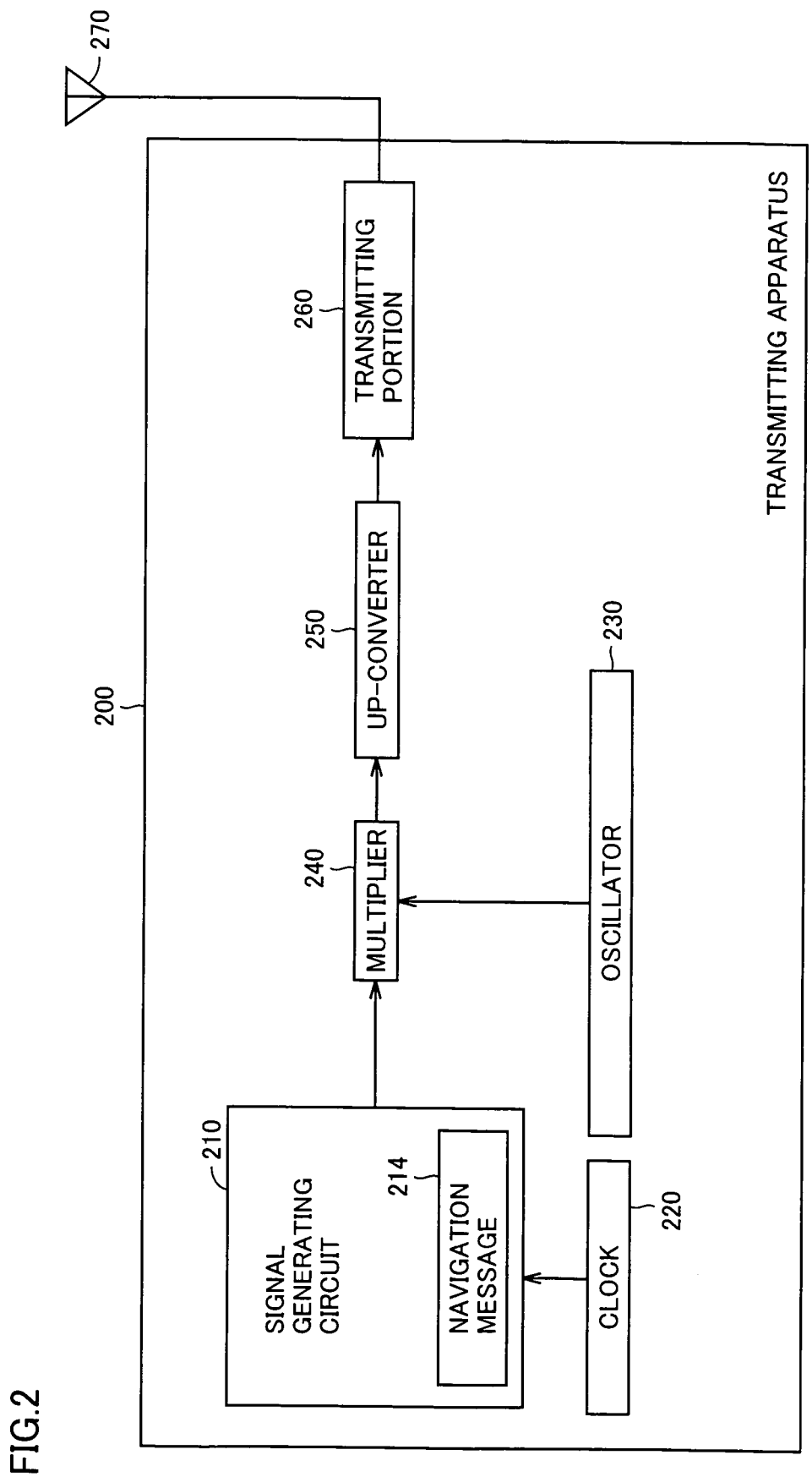
FIG. 2 is a block diagram representing a hardware configuration of a transmitting apparatus 200 constituting the system in accordance with the first embodiment of the present invention.

Referring to FIG. 2, transmitting apparatus 200 forming the system in accordance with an embodiment of the present invention will be described. FIG. 2 is a block diagram representing a hardware configuration of transmitting apparatus 200.

Transmitting apparatus 200 includes a signal generating circuit 210, a clock 220, an oscillator 230, a multiplier 240, an up-converter 250, a transmitting portion 260 and an antenna 270. Time data measured by clock 220 is input to signal generating circuit 210. Signal generating circuit 210 generates a positioning signal (for example, a GPS signal) based on the time data and navigation message 214. Navigation message 214 is transmitted, for example, from a base station (not shown) on the ground for the satellite.

Signal generating circuit 210 generates the signal by encoding based on, for example, spread spectrum communication system. The signal output from signal generating circuit 210 is input to multiplier 240. The signal output from oscillator 230 is also input to multiplier 240. Multiplier 240 modulates the positioning signal from signal generating circuit 210 by a carrier wave from oscillator 230, and generates a signal of intermediate frequency. The generated signal is input to up-converter 250.

Up-converter 250 increases the frequency of the intermediate frequency signal output from multiplier 240 to a frequency for transmission through the space, and outputs the up-converted signal to transmitting portion 260. Transmitting portion 260 includes a high-power amplifier (not shown), enhances the output for transmitting the input signal, and transmits the signal with the output thus enhanced. The signal is transmitted to the outer space through antenna 270.

In the following, the GPS signal as an example of the positioning signal will be described.

Figure 3:
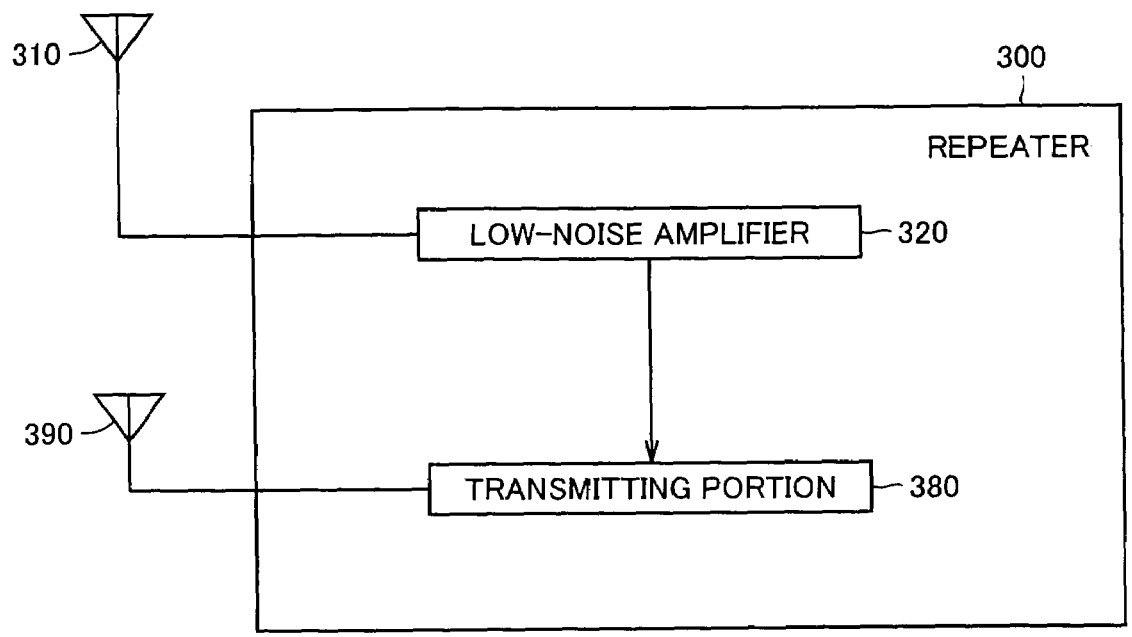
FIG. 3 is a block diagram representing a hardware configuration of a repeater 300 constituting the system in accordance with the first embodiment of the present invention.

Assume that transmitting apparatus 200 is an apparatus for transmitting the GPS signal. In that case, the signal from transmitting apparatus 200 is encoded by spread spectrum system using a C/A code (Coarse and Access Code) (also referred to as a PRN (Pseudo Random Noise) code) consisting of a quasi-random sequence that can identify the satellite. Here each C/A code (P code) consists of 1024 bits. It should be noted that since the positioning signal is modified from GPS signal in the embodiment according to the invention, the transmitted signal is not equivalent to the GPS signal in itself Referring to FIG. 3, a repeater constituting the system as a relay apparatus in accordance with an embodiment of the present invention will be described. FIG. 3 is a block diagram representing a hardware configuration of repeater 300. Here, repeater 300 generally represents repeaters 300-1 and 300-2 shown in FIG. 1 as well as other repeaters.

Repeater 300 includes an antenna 310, a low-noise amplifier 320, a transmitting portion 380 and an antenna 390. Antenna 310 receives a signal (for example, Lqz(1) and Lqz(2) shown in FIG. 1) transmitted from transmitting apparatus 200. The received signal is input to low-noise amplifier 320. Low-noise amplifier 320 amplifies the input weak signal and outputs the same to transmitting portion 380. Transmitting portion 380 transfers the signal to antenna 390. Antenna 390 outputs the signal from transmitting portion 380. Specifically, repeater 300 transmits the signal received by antenna 310 again, with the contents unchanged. Therefore, when the signal received by repeater 300 contains time information, for example, the signal is output as it is with the information unchanged.

Antenna 310 may further have a driving apparatus (not shown) such as an actuator for changing the direction of antenna 310, and a controller (not shown) controlling the position of the driving apparatus. In this case, as the position of the driving apparatus is changed by controller, antenna 310 can more reliably receive the radio wave transmitted from transmitting apparatus 200.

Figure 4:
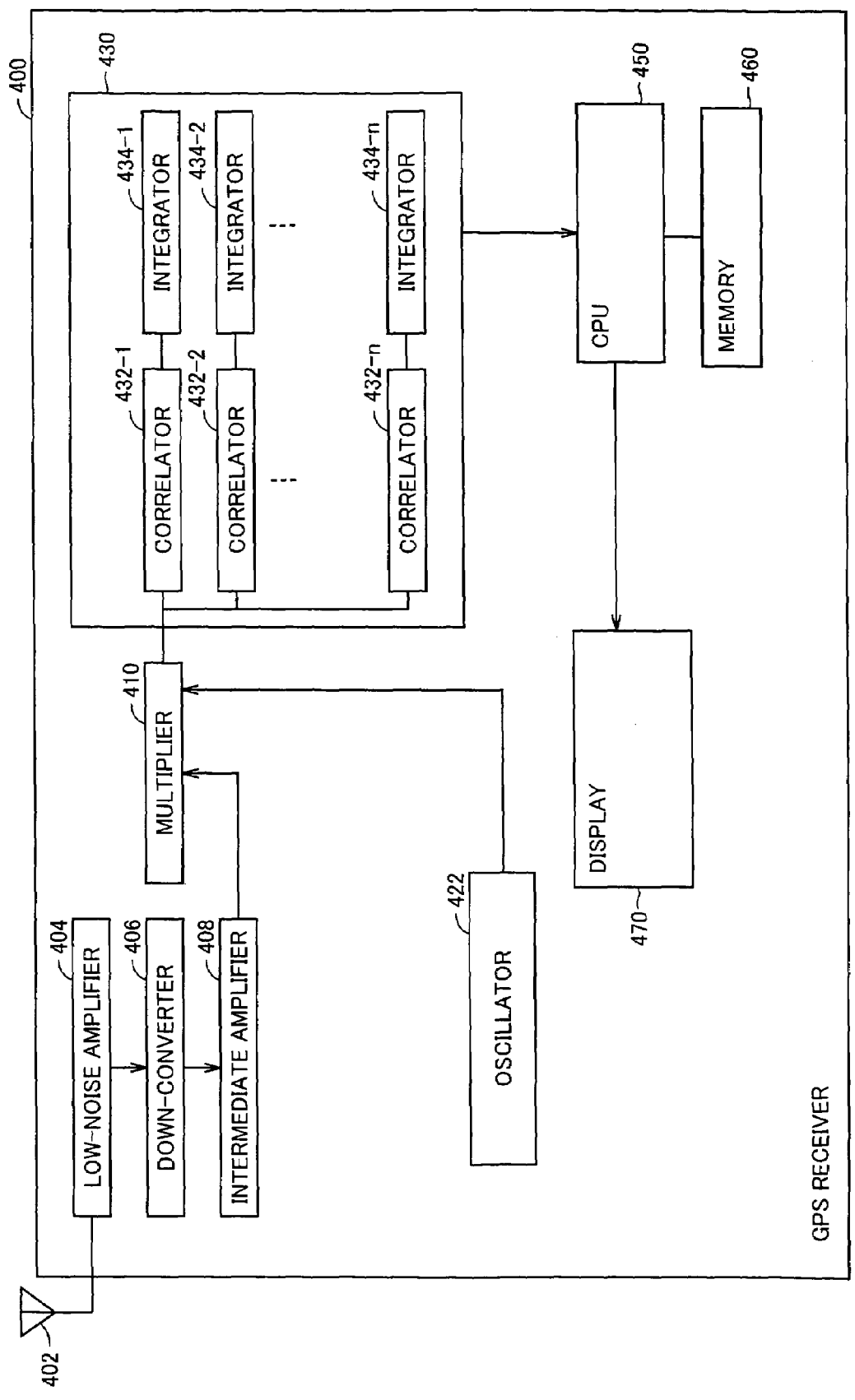
FIG. 4 is a block diagram representing hardware configuration of a GPS receiver 400 capable of receiving the signal transmitted from the system in accordance with the first embodiment of the present invention.

Referring to FIG. 4, a GPS receiver 400 that can receive the signal transmitted from the system in accordance with an embodiment of the present invention will be described. FIG. 4 is a block diagram representing a hardware configuration of GPS receiver 400. GPS receiver 400 is, by way of example, a dedicated apparatus for positioning having the GPS function, a portable telephone having the GPS function or the like.

GPS receiver 400 includes an antenna 402, a low-noise amplifier 404, a down-converter 406, an intermediate amplifier 408, a multiplier 410, a parallel correlator circuit 430, an oscillating circuit 422, a CPU (Central Processing Unit) 450, a memory 460 and a display 470. Memory 460 is implemented, for example, by a flash memory, and stores externally input ephemeris and software for executing an operation for specifying a position. The information stored in memory 460 may be obtained through a communication network such as the Internet, from an information provider or a system developer that already have such information. Alternatively, the information may be obtained from the GPS signal. More specifically, when GPS receiver 400 is a portable telephone, by way of example, the information may be stored by a user or manufacturer of the telephone in GPS receiver 400.

The positioning signal is received by antenna 402. The signal is input to low-noise amplifier 404. Low-noise amplifier 404 cuts the noise, filters and amplifies the signal, and outputs the amplified signal to down-converter 406. Down-converter 406 converts the signal to an intermediate frequency signal, and outputs the result to intermediate amplifier 408. Intermediate amplifier 408 amplifies the input intermediate frequency signal and outputs the result to multiplier 410.

From oscillating circuit 422, a signal having the frequency $(f_{IF}+f_D)$, that is, the frequency $f_{IF}$ of the intermediate frequency signal shifted by Doppler frequency $f_D$ calculated based on the ephemeris, is output. The signal having this frequency is input to multiplier 410.

Multiplier 410 multiplies the signal of this frequency from oscillating circuit 422 and the signal from intermediate amplifier 408. Thus, the intermediate frequency signal is converted to a baseband signal.

The signal from multiplier 410 is input to parallel correlator circuit 430. Parallel correlator circuit 430 includes a plurality of correlators 432-1 to 432-$n$ arranged parallel to each other to enable simultaneous execution of a process for detecting delay possibly experienced when the positioning signal propagates. Each correlator is hardware-implemented. Respective correlators correspond to the possible propagation delay time of positioning signals from a plurality of artificial satellites 102, 104 and 106. Therefore, after the signal mentioned above is input to parallel correlator circuit 430, each correlator executes a process to establish correlation with a locally generated PRN code, whereby the propagation delay times of the positioning signals transmitted from a plurality of satellites (corresponding to phase delay of the signal from the locally generated PRN code) can be calculated in parallel.

Here, the number of "possible propagation delay times of positioning signals" will be described. Assume that two samples are sampled per 1 chip (bit) of the PRN code. In one period of the PRN code, there are 2046 samples, in other words, the number of possible delay samples is 2046. Taking into consideration that the PRN code is common, as shown in FIG. 1, the sample number is 2046 (possible delays per channel)×2 channels (I and Q components)=4092.

The output from parallel correlator circuit 430 is accumulated, by way of example, over a plurality of PRN code periods with phase aligned (in coherent manner) for in-phase component (I component) and quadrature component (Q component) period by period of the PRN code, by an integrator 434-1. Outputs from respective integrators 434-1 to 434-$n$ are each squared in an operator (not shown), and an absolute value is taken out. The taken outputs are accumulated by an accumulator (not shown) in a non-coherent manner. After the accumulating process by the accumulator, noise in the signals are suppressed, an output of a correlator corresponding to the phase delay described above is monitored as a peak, and stored in memory 460.

Specifically, in the example shown in FIG. 1, when correlation is calculated by parallel correlator circuit 430 using a common PRN code, it follows that signals from three artificial satellites 102, 104 and 106 are calculated in parallel, and peaks for respective signals are detected.

Phase delay of positional signals from specific artificial satellites 102, 104 and 106, that is, propagation delay times of positional signals can be known. Further, based on the information stored in advance in memory 460, orbit information of each artificial satellite can be obtained. Here, combinations of satellite positions specified by the orbit information based on the received signals are in finite number. Therefore, similar to a conventional signal processing such as GPS signal processing, an operation is possible to specify the position of GPS receiver 400. This operation is executed, for example, by CPU 450.

Detailed operation of parallel correlator circuit 430 is as follows. An IF input sample having an intermediate frequency is multiplied with an output from a numerical control oscillator (hereinafter denoted by NCO) in multiplier 410, and I component and Q component are separated.

Thereafter, an output from multiplier 410 is re-sampled by a re-sampler (not shown) at a sample rate appropriate for the correlating process. The re-sampling rate is determined by a second NCO (not shown). An output of the second NCO is programmed based on a pseudo-distance expected in advance from the ephemeris and coarse positional information of GPS receiver 400, for the incoming signal.

An output of the re-sampler is input to correlators 432-1 to 432-n calculating convolution between the received positioning signal and a set of reference waveforms (PRN codes) for artificial satellites 102, 104 and 106 that are at visible positions. Each channel includes a plurality of delay elements (not shown). An operation logic block (not shown) calculates correlation between the entire characteristic period of the input data and a full PRN code sequence for a desired satellite. Here, the "entire characteristic period (epoch)" refers to a period that corresponds to one period of the PRN code, and when one period of a PRN code consists of 1024 chips (bits) and there are two samples per one chip, it corresponds to a period of 2046 samples.

In each clock period in which parallel correlator circuit 430 operates, a result of calculation of a new correlation value for one specific delay time is generated and stored in memory 460. Therefore, at the end of the entire characteristic period, memory 460 come to have a full set of correlation results for all possible delays stored therein. The sequence of correlation results corresponds to convolution between the input signals and the reference waveforms locally generated by the PRN code generator.

Though a main frame of a GPS signal as one type of the positioning signals has the period of 30 seconds, the delay time from each satellite can be specified within, for example, 1 second, because of such a configuration of parallel correlator circuit 430 as described above. Therefore, as compared with the method that necessitates extraction of navigation message directly from the received GPS signal, the position calculating process can be done at a higher speed.

Referring again to FIG. 4, CPU 450 executes an operation for specifying the position of receiving apparatus 400, based on the information stored in memory 460 and on the information output from parallel correlator circuit 430. This process is well known, and therefore, description thereof will not be given here. Further, CPU 450 executes a process for generating data to display an image on display 470. By way of example, this process is for generating data for display based on the calculated positional information and image data obtained separately. The data for display is stored in a VRAM (Video Random Access Memory) (not shown). Display 470 displays an image based on the data.

Figure 5:
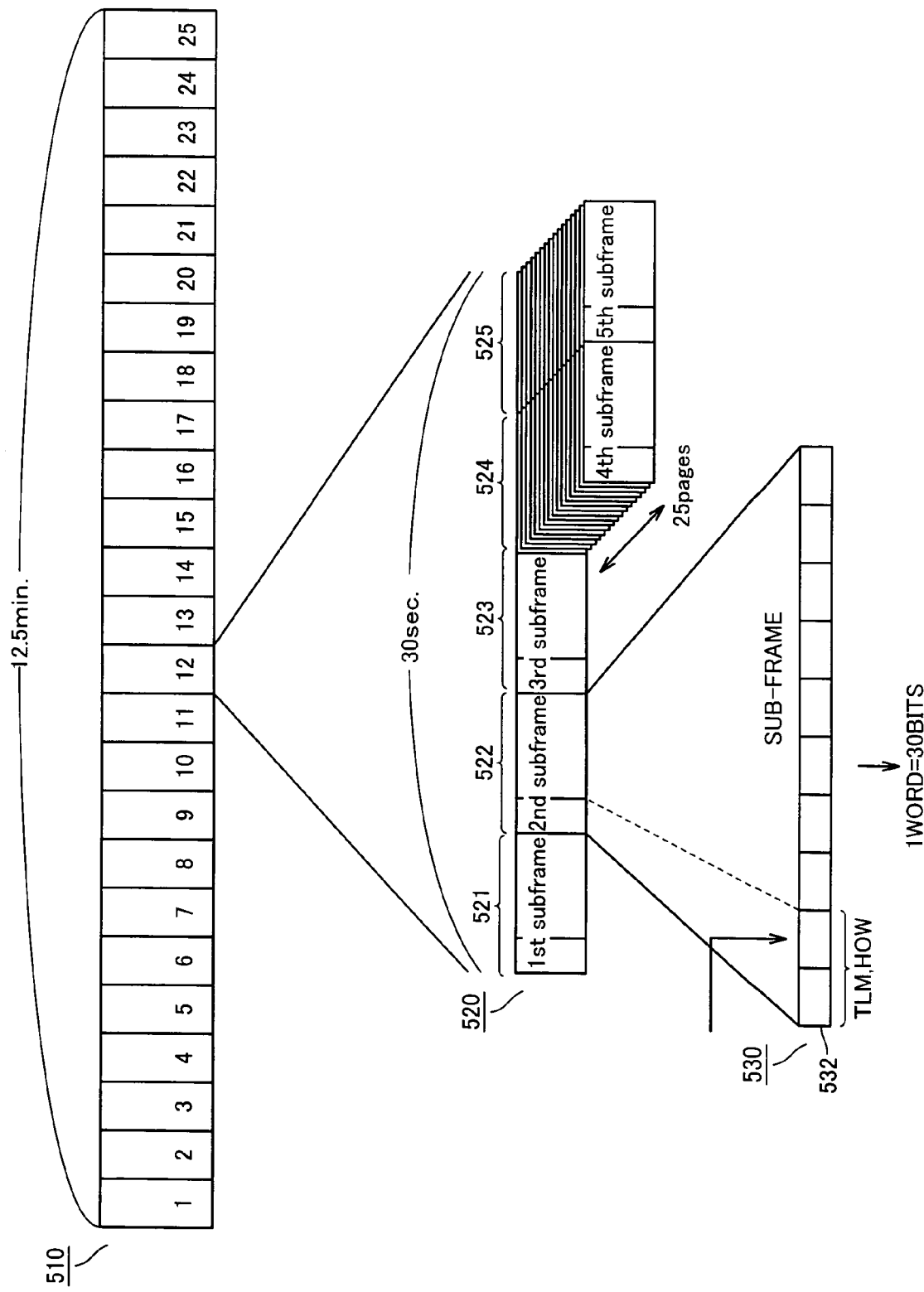
FIG. 5 schematically shows a structure of the signal from the system for transmitting a signal for positioning in accordance with the first embodiment of the present invention.

Referring to FIG. 5, a structure of the signal transmitted from the system transmitting the positional signal in accordance with the present embodiment will be described. FIG. 5 schematically shows the structure of the GPS signal as one type of the positioning signal.

The GPS signal transmitted from transmitting apparatus 200 includes 25 main frames. It takes 30 seconds to receive each frame. Therefore, in order to receive all the frames, it takes 12 minutes and 30 seconds. The main frame includes a navigation message. The navigation message includes time correction data, almanac, orbit information, ionosphere correction data and so on. The navigation message is transmitted from a base station on the ground to, for example, transmitting apparatus 200 mounted on artificial satellite 102. The transmission may be together with transmission of a signal for correcting time of clock 220 provided on transmitting apparatus 200. Alternatively, the navigation message may be transmitted by itself, as needed.

Mainframe 520 includes five sub-frames 521 to 525. The fourth sub-frame 524 and the fifth sub-frame 525 each include 25 pages. A sub-frame includes 10 words in 6 seconds. The first word includes a telemetry word (TLM). The second word is a hand-of-word (HOW).

Figure 6:
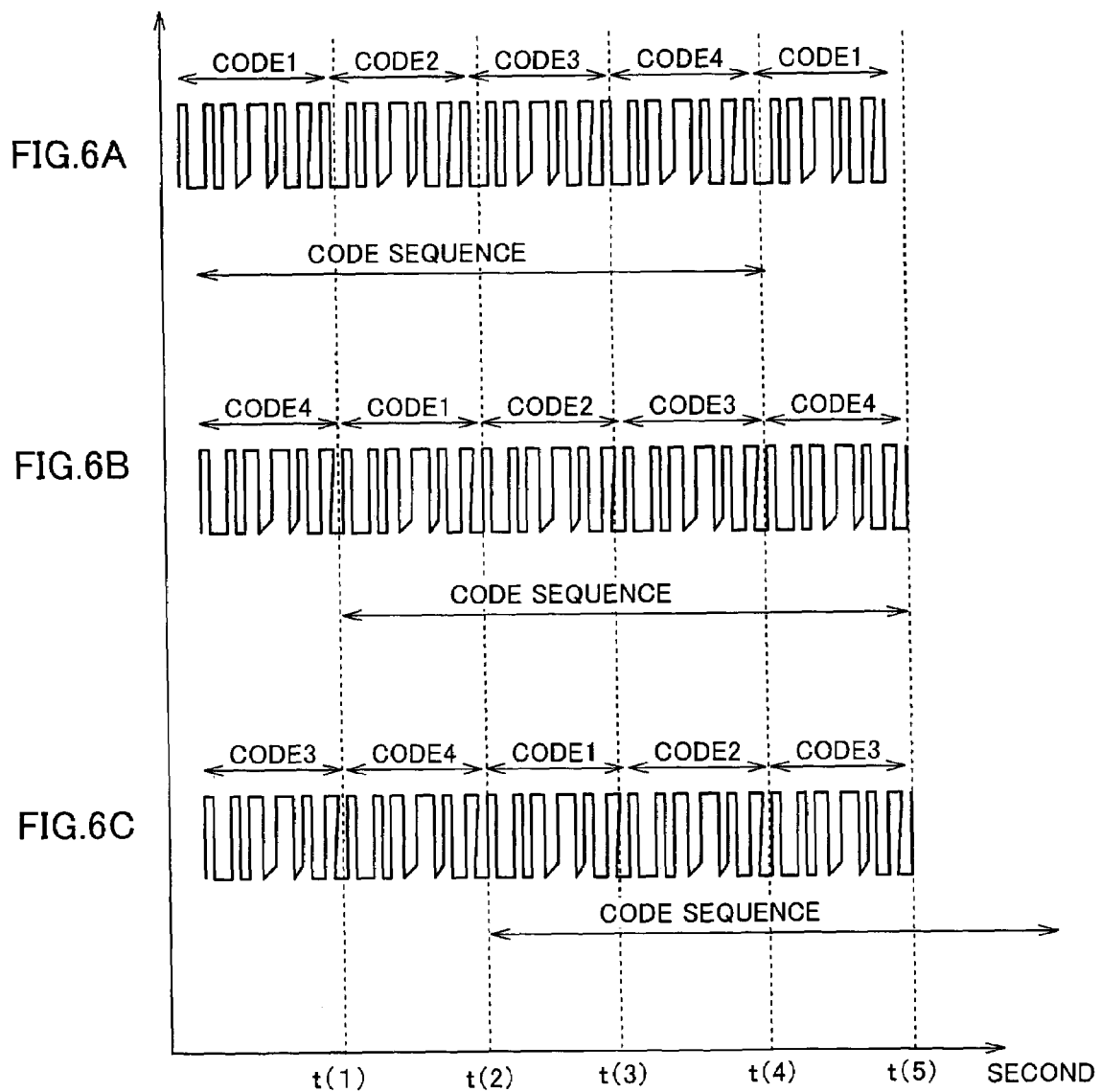
FIG. 6A represents the structure of the signal transmitted by a transmitting apparatus 200.
FIG. 6B represents the structure of the signal transmitted by a repeater 300-1.
FIG. 6C represents the structure of the signal transmitted by a repeater 300-2.

Referring to FIGS. 6A to 6C, a manner of positioning signal transmission will be schematically described. FIG. 6A is an illustration schematically showing the structure of the PRN code transmitted by transmitting apparatus 200. FIG. 6B is an illustration schematically showing the structure of the PRN code transmitted by repeater 300-1. FIG. 6C is an illustration schematically showing the structure of the PRN code transmitted by repeater 300-2. For simplicity of description, here, an example will be taken that includes four PRN codes. It should be noted that the positioning signal is a combination of many PRN sequences.

As can be seen from FIG. 6A, when transmitting apparatus 200 transmits signals having four PRN codes accumulated, the signals contain CODE 1, CODE 2, CODE3 and CODE4. At time point t(1), transmitting apparatus 200 is transmitting a code, CODE1. Thereafter, at time point t(2), transmitting apparatus 200 has finished transmission of CODE2. At time point t(3), transmitting apparatus 200 has finished transmission of CODE3. At time point t(4), transmitting apparatus 200 has finished transmission of CODE4. At time point t(5), transmitting apparatus 200 has finished transmission of a new CODE1 included in the next code sequence.

In this case, repeater 300-1 receives the signal transmitted from transmitting apparatus 200 after a delay time corresponding to the distance determined by the positional relation between transmitting apparatus 200 and repeater 300-1. Repeater 300-1 transmits the signal thus received after the delay time, and therefore, the signal sequence transmitted by repeater 300-1 is generated delayed from the signal sequence transmitted by transmitting apparatus 200.

Specifically, as can be seen from FIG. 6B, at time point t(1), repeater 300-1 has finished transmission of CODE4 that has been transmitted in the past by transmitting apparatus 200. At time point t(2), repeater 300-1 transmits, with a delay, CODE1 that has been transmitted by transmitting apparatus at time t(1). Similarly, repeater 300-1 finishes transmission of CODE2 at time point t(3). Transmission of this signal by transmitting apparatus 200 has been finished at time point t(2). Repeater 300-1 finishes transmission of CODE3 at time point t(4). Transmission of this signal by transmitting apparatus 200 has been finished at time point t(3). Similarly, repeater 300-1 finishes transmission of CODE4 at time point t(5). This signal has been transmitted by transmitting apparatus 200 at time point t(4).

As can be seen from FIG. 6C, repeater 300-2 transmits the signal received from transmitting apparatus 200 delayed from transmission timings of transmitting apparatus 200 and repeater 300-1. For example, CODE 1 that has been transmitted at time point t(1) by transmitting apparatus 200 is finished by repeater 300-2 at time point t(3).

In this manner, one same signal is output at different time points from transmitting apparatus 200 and repeaters 300-1 and 300-2, respectively. Receiving apparatuses 400-2 and 400-3 receiving these signals execute a process for calculating the positional information, using these signals as GPS signals respectively transmitted from transmitting apparatus 200 and repeaters 300-1 and 300-2. Here, the clock error included in the signal (FIG. 6B) transmitted by repeater 300-1 and in the signal (FIG. 6C) transmitted by repeater 300-2 is the same as the clock error included in the signal (FIG. 6A) transmitted by transmitting apparatus 200. Therefore, without an orbit error and a difference in signal propagation errors, chunk signals are perfectly synchronized. Each receiving apparatus can accurately calculate the positional information, as will be described later. Further, as shown in FIG. 3, it is unnecessary to provide a clock for obtaining time information in repeaters 300-1 and 300-2. Therefore, time correcting process becomes unnecessary for repeaters 300-1 and 300-2, making maintenance easier. Further, repeaters 300-1 and 300-2 can be formed easily at a lower cost than apparatuses that need the clock.

Figure 7:
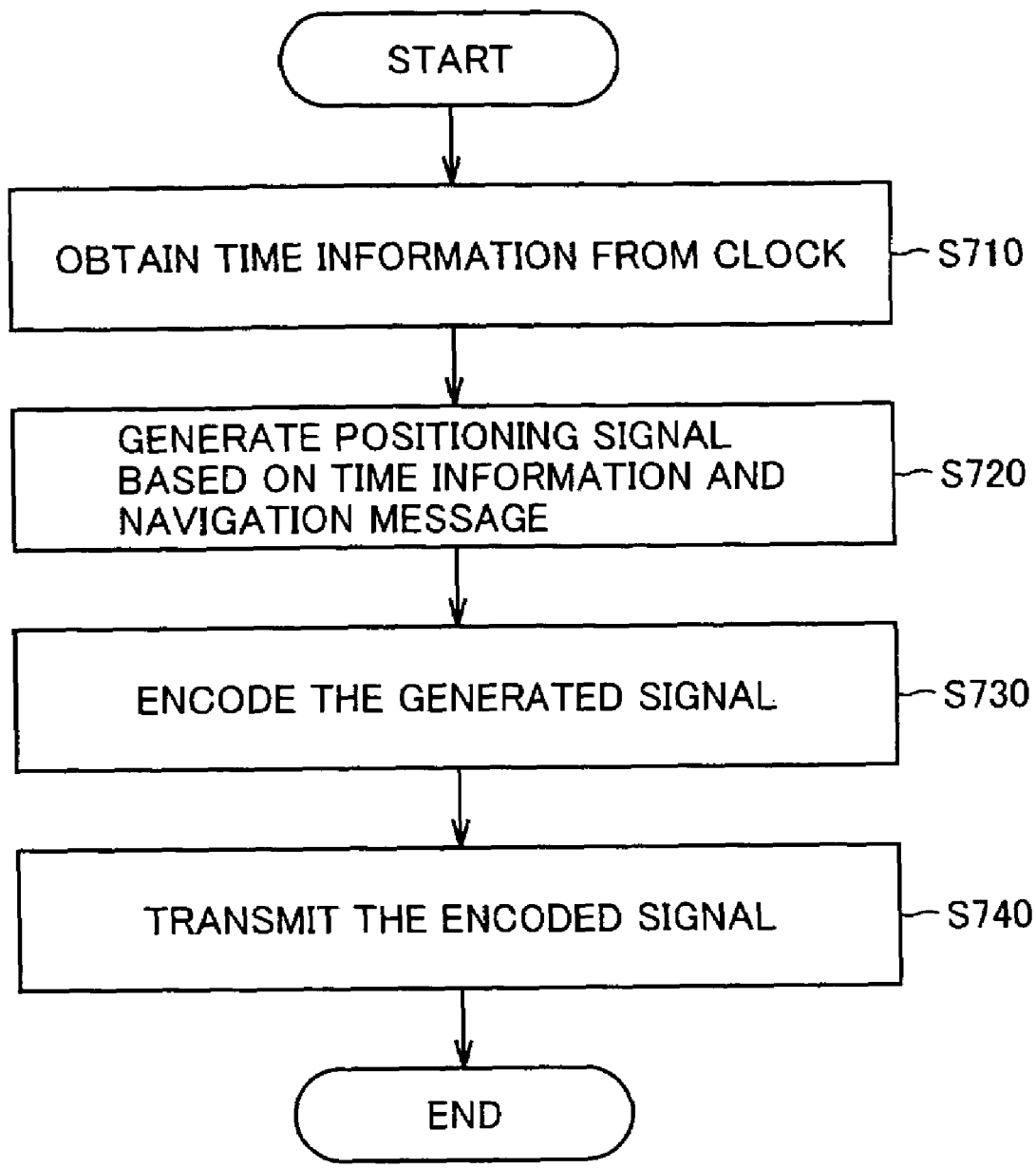
FIG. 7 is a flow chart representing process steps for transmitting the signal for positioning, executed by transmitting apparatus 200.

Referring to FIG. 7, a control structure of transmitting apparatus 200 will be described. FIG. 7 is a flow chart showing process steps for transmitting the positioning signal, executed by transmitting apparatus 200.

In step S710, signal generating circuit 210 of transmitting apparatus 200 obtains time information from clock 220. In step S720, signal generating circuit 210 generates a positioning signal based on the time information and the navigation message.

In step S730, signal generating circuit 210 encodes the signals using predetermined codes, and outputs the encoded signals to multiplier 240. The codes with PRN are, by way of example, for identifying artificial satellites 102, 104, 106 and possibly more such as relay apparatuses 130-1, 130-2, 130-3, pseudolites or the like. Objects identified by the codes depend on an orbit and code chunks. The signal is modulated by multiplier 240 and output to up-converter 250. Up-converter 250 converts the frequency of the signal from multiplier 240 to a high frequency, and the converted signal is input to transmitting portion 260.

In step S740, transmitting portion 260 converts the signal output from up-converter 250 to a high output, and transmits the converted signal. The length of the code transmitted in this manner is, for example, from 1 mili-second to one week. Preferably, it is between one second and one hour, for example, a few seconds to several tens of seconds.

Figure 8:
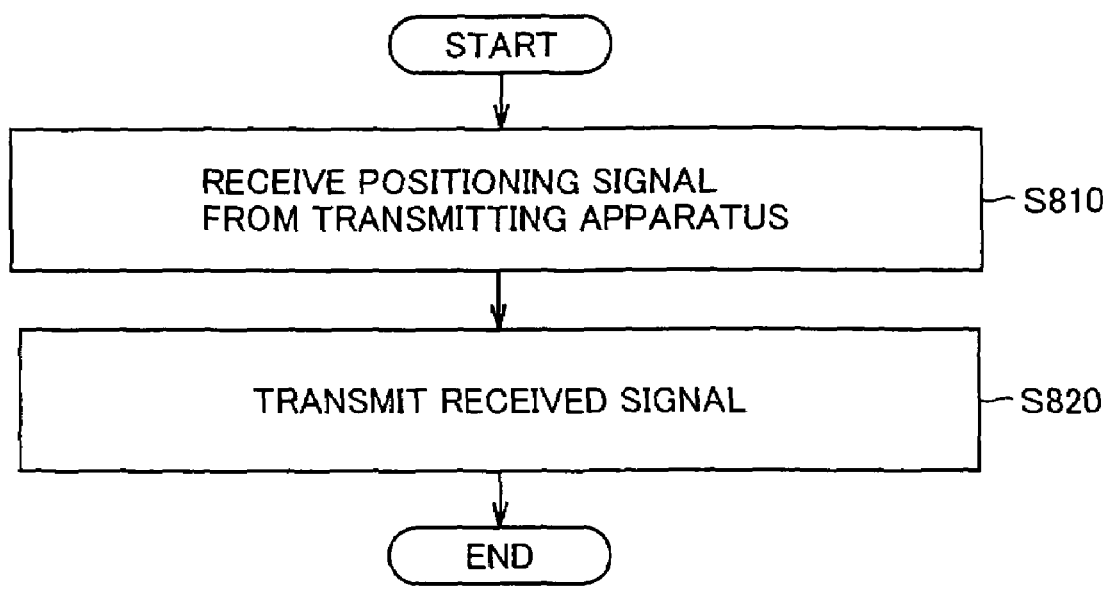
FIG. 8 is a flow chart representing steps of a signal relaying process executed by repeater 300.

Referring to FIG. 8, a control structure of the repeater constituting the system in accordance with an embodiment of the present invention will be described. FIG. 8 is a flow chart showing process steps executed by repeater 300 for transmitting signals.

In step S810, repeater 300 receives a signal transmitted from transmitting apparatus 200, through antenna 310. The signal is input to low-noises amplifier 320, subjected to amplification, and output to transmitting portion 380.

In step S820, transmitting portion 380 enhances the output of the signal, and transmits the same as a high-output signal. The signal is broadcast to the outer space, through antenna 390. In this manner, repeater 300 outputs the signal received from transmitting apparatus 200. Therefore, information (for example, time information) included in the signal is unchanged.

In another aspect, repeaters 300-1 and 300-2 may add data for identifying artificial satellites 104 and 106 on which the repeaters are mounted, to the received signal. In this case, the receiving apparatus receiving the signal from repeater 300 can readily recognize that the signal is transmitted from artificial satellite 104 or 106. Therefore, in the process for calculating positional information by GPS receiver 400, the process for specifying the source of the signal can be omitted. This enables calculation of the position of receiving apparatus through the conventionally used process for calculating positional information. Thus, a receiving apparatus having a function of calculating positional information may have a general configuration.

Figure 9:
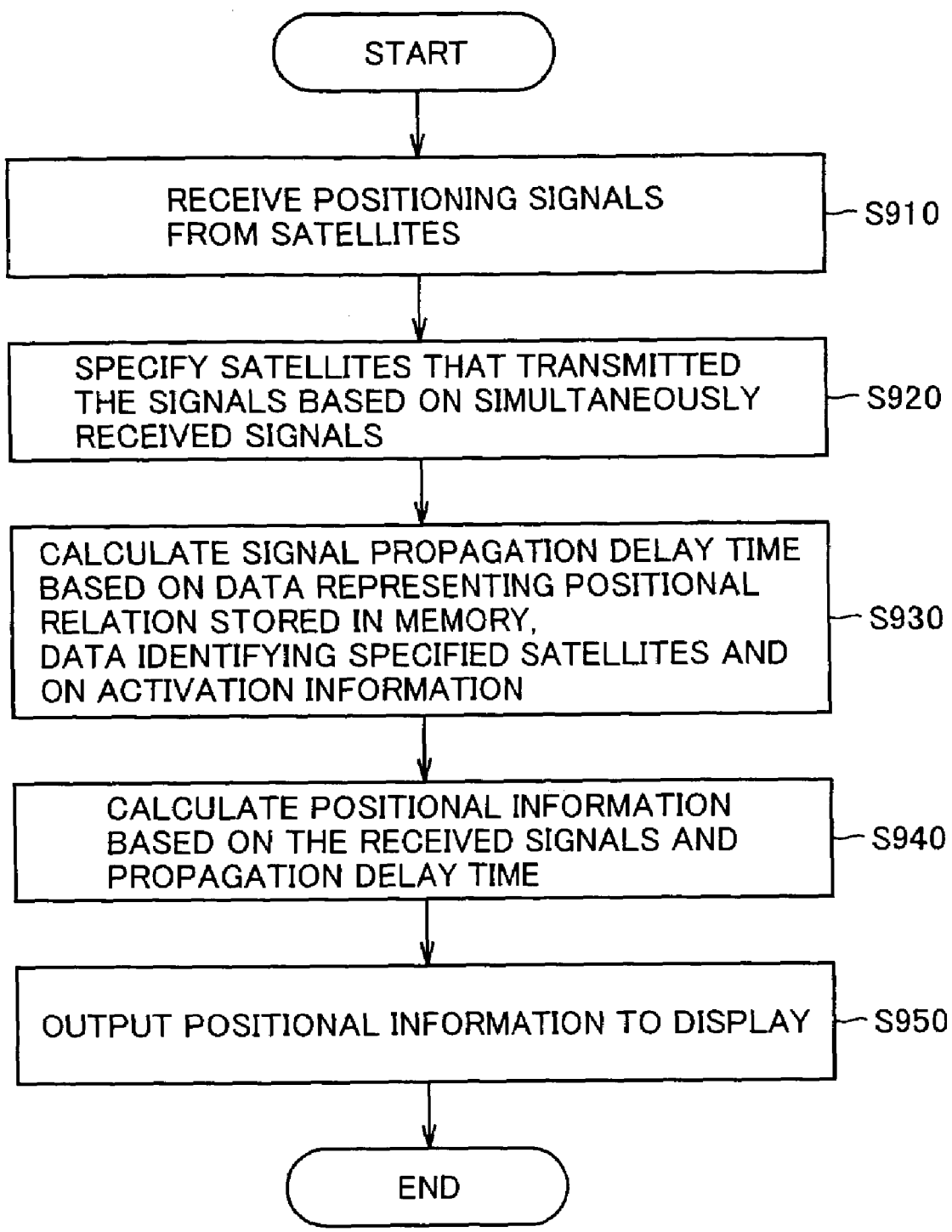
FIG. 9 is a flow chart representing process steps executed by GPS receiver 400 capable of receiving the signal transmitted from the system in accordance with an embodiment of the present invention.

Referring to FIG. 9, a control structure of a receiving apparatus that can receive the signal transmitted by the system in accordance with an embodiment of the present invention will be described. FIG. 9 is a flow chart representing process steps executed by GPS receiver 400.

In step S910, GPS receiver 400 receives positioning signals from artificial satellites 102, 104 and 106 through antenna 402. In step S920, GPS receiver 400 specifies, based on the first received signal, the artificial satellite that transmitted the signal. In the example shown in FIG. 1, artificial satellite 102 is specified.

In step S930, GPS receiver 400 calculates signal propagation delay time based on the data representing position stored in memory 460 and on the received signals. Here, the data representing position may be the one representing relative positions (such as distance between each of the satellites) of artificial satellites 102, 104 and 106. When the position of any of the satellites can be specified by the data, positions of other satellites can naturally be specified.

Specifically, the positional relation between each of transmitting apparatus 200 and repeaters 300-1 and 300-2 is known beforehand, and therefore, when GPS receiver 400 receives a plurality of signals having the same time information, it can readily be specified that the source of the signals received simultaneously is transmitting apparatus 200. The propagation delay time of the GPS signal can be calculated when transmission apparatus 200 is specified. Namely, time points at which one the same signal is received differ, and hence, difference between reception time points is calculated. Using this result, it is possible to narrow the candidates of repeaters that can relay the signal transmitted from transmitting apparatus 200. Thus, GPS receiver 400 can specify a repeater as a transmission source of the actually received signal by, for example, combining repeater candidates.

In step S940, GPS receiver 400 calculates positional information representing the position of GPS receiver 400, based on the received signals and the calculated propagation delay time. In step S950, GPS receiver 400 outputs the positional information to display 470.

In this manner, according to the system transmitting a positioning signal in accordance with the first embodiment of the present invention, transmitting apparatus 200 transmits a signal including time information. The transmitted signal is received by GPS receiver 400 and repeaters 300-1 and 300-2. Repeaters 300-1 and 300-2 outputs the received signal. Here, the contents of time information contained in the signal are unchanged. The signals output from repeaters 300-1 and 300-2 are received by GPS receiver 400.

GPS receiver 400 holds, in advance, data representing relation between transmitting apparatus 200 and the position of each of the repeaters including repeaters 300-1 and 300-2. Therefore, even when GPS receiver receives signals containing the same time information a number of times, it is possible for GPS receiver 400 to specify a repeater as the transmission source of each signal, based on the data. Thus, GPS receiver 400 can calculate information that represents the position of itself Here, the time information contained in each signal is generated based on clock 220 mounted on transmitting apparatus 200, and therefore, synchronization is established. Accordingly, GPS receiver 400 receives signals that are synchronized in time information, and therefore, the positional information calculated from such signals does not involve any time error.

Thus, a system transmitting synchronized signals for positioning can be provided. Further, a system transmitting synchronized signals for positioning can be provided using one clock in the system.

Second Embodiment

In the following, a second embodiment of the present invention will be described. The system for transmitting signals for positioning in accordance with the present embodiment differs from the system in accordance with the first embodiment in that the system is built on the ground.

Figure 10:
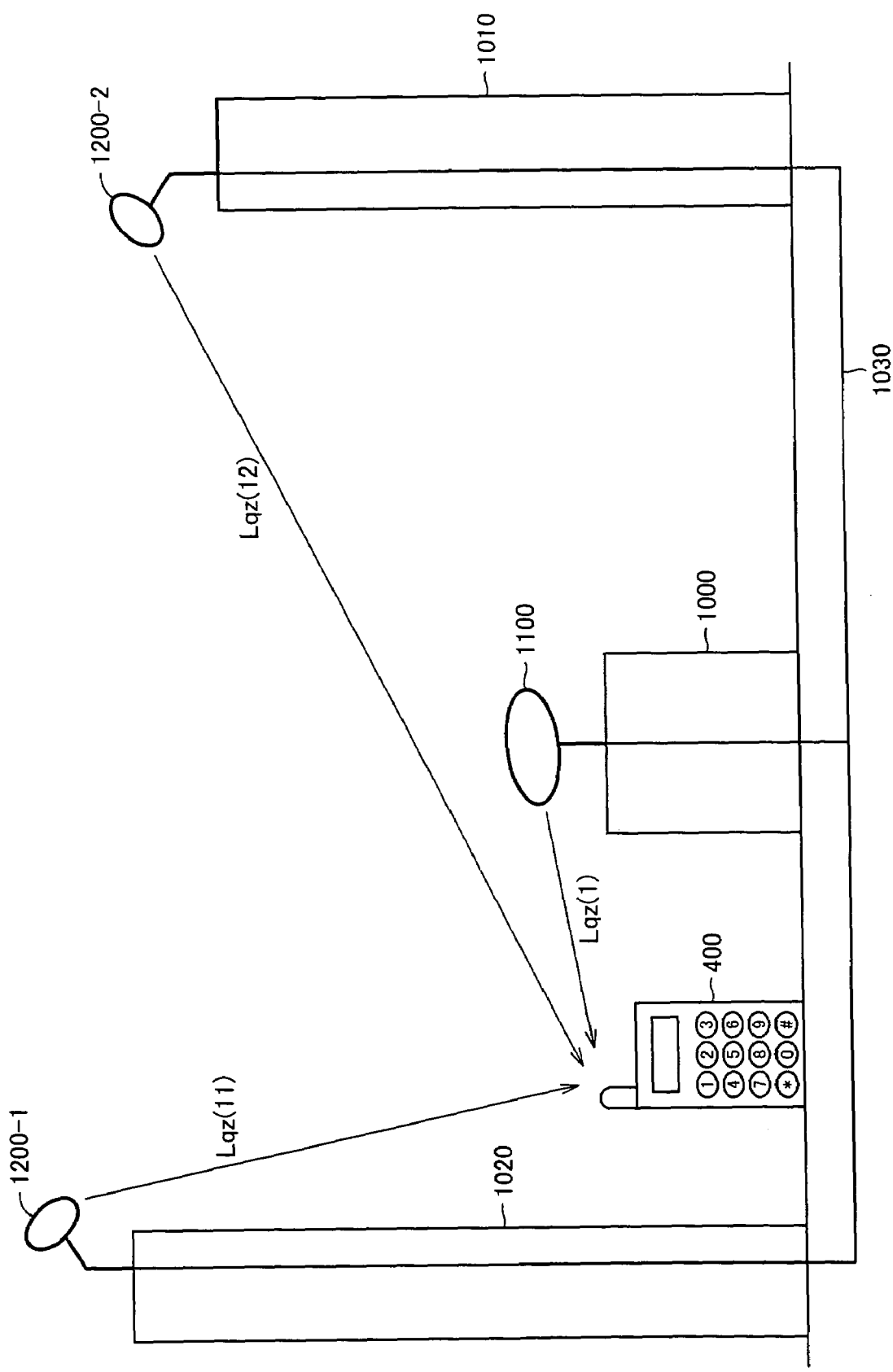
FIG. 10 represents an exemplary configuration of the system in accordance with a second embodiment of the present invention.

Referring to FIG. 10, the system of the present embodiment will be described. FIG. 10 shows an exemplary configuration of the system on the ground.

A transmitting apparatus 1100 transmitting a positioning signal is mounted on a roof of a building 1000. On the roofs of buildings 1010 and 1020, repeaters 1200-1 and 1200-2 capable of transmitting positioning signals are mounted, respectively. Repeaters 1200-1 and 1200-2 are connected to transmitting apparatus 1100 through a network 1030. Here, positional relation between transmitting apparatus 1100 and repeaters 1200-1 and 1200-2 is known beforehand. To network 1030, a base station server that can provide data representing the positional relation, for example, is connected. The network 1030 is, by way of example, the Internet. However, it may be any private network.

When transmitting apparatus 1100 transmits a positioning signal Lqz(1), the signal is transmitted by radio wave and transferred to repeaters 1200-1 and 1200-2, through network 1030, as shown in FIG. 10. For example, repeater 1200-1 receives the signal from transmitting apparatus 1100, and transmits the signal as Lqz(11) without any processing. Similarly, repeater 1200-2 receives signal Lqz(1) input from transmitting apparatus 1100 and transmits the signal as Lqz(12). Therefore, from the view point of PRN code, signals Lqz(1), Lqz(11) and Lqz(12) are the same signal.

In such an environment, GPS receiver 400 receives three signals as positioning signals, that is, Lqz(1), Lqz(11) and Lqz(12). GPS receiver 400 can calculate positional information based on respective received signals.

Figure 11:
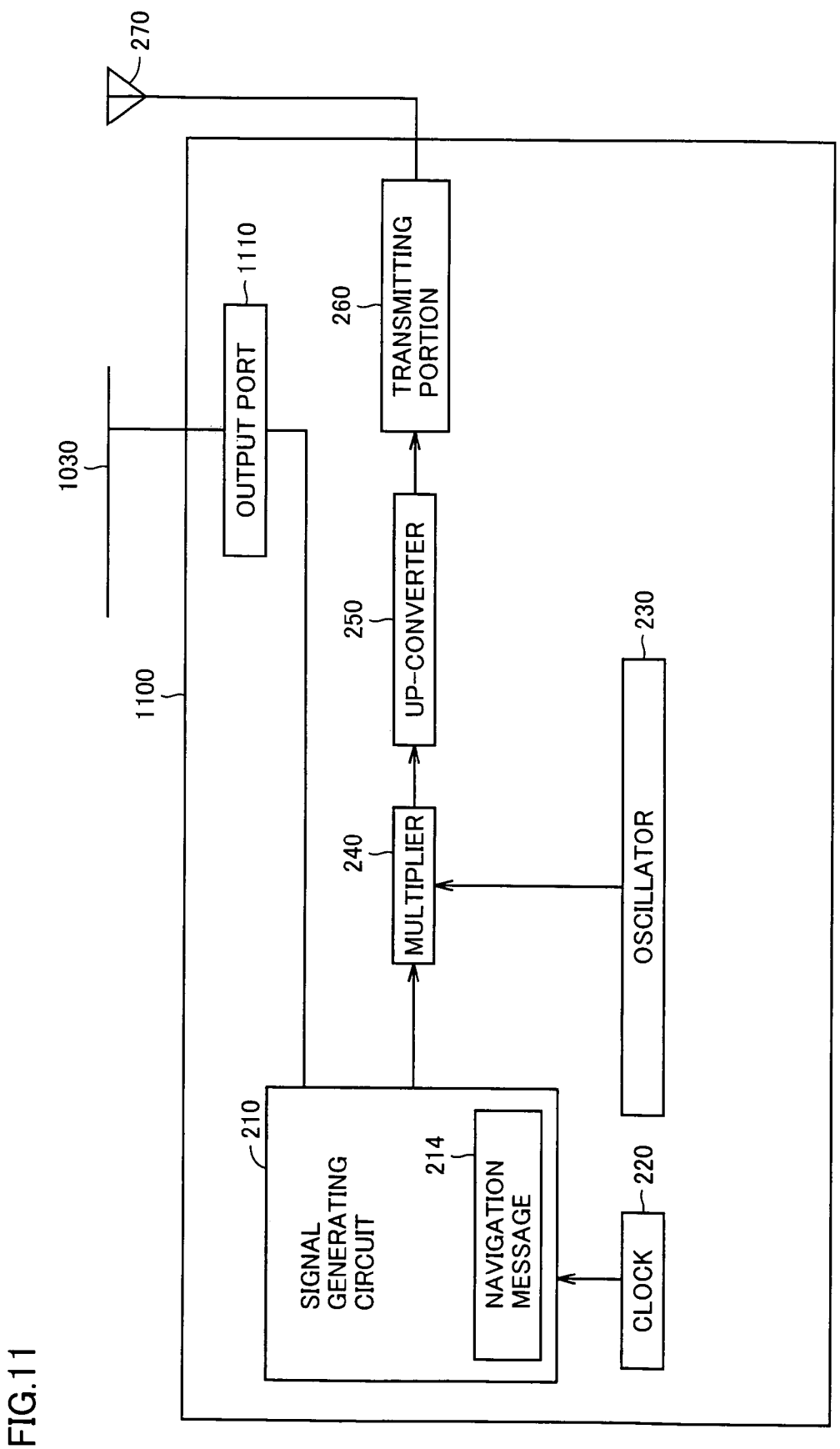
FIG. 11 is a block diagram representing a hardware configuration of a transmitting apparatus 1100 constituting the system in accordance with the second embodiment of the present invention.

Referring to FIG. 11, transmitting apparatus 1100 constituting the system in accordance with the present embodiment will be described. FIG. 11 is a block diagram representing a hardware configuration of transmitting apparatus 1100.

Transmitting apparatus 1100 includes, in addition to the configuration shown in FIG. 2, an output port 1110. Output port 1110 outputs a signal provided from signal generating circuit 210 to network 1030.

Figure 12:
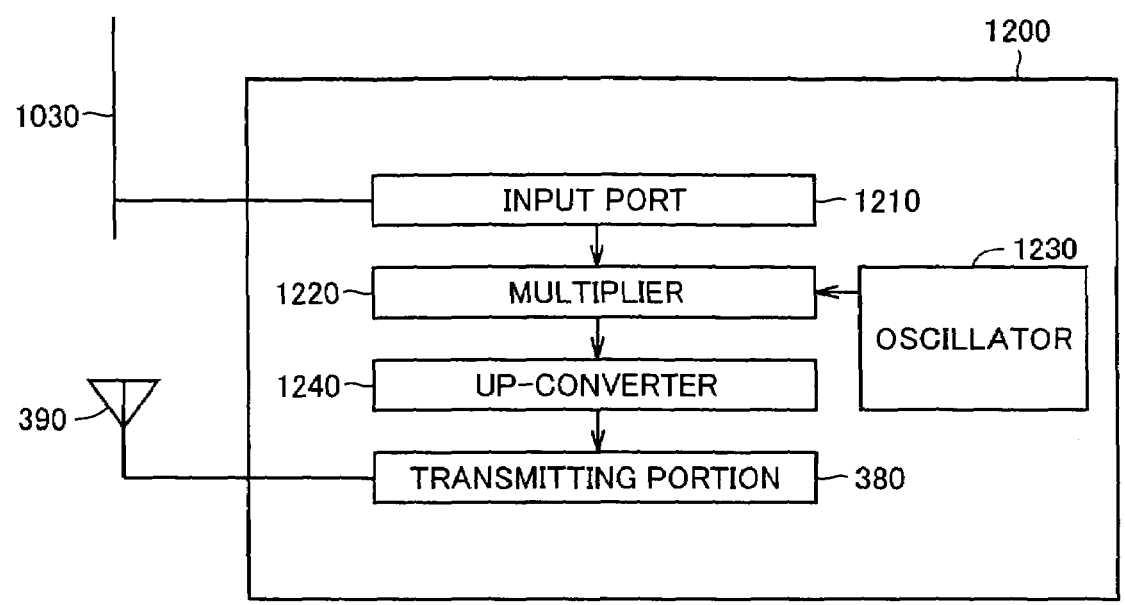
FIG. 12 is a block diagram representing a hardware configuration of a repeater constituting the system in accordance with the second embodiment of the present invention.

Referring to FIG. 12, configurations of repeaters 1200-1, 1200-2 constituting the system of the present embodiment will be described. FIG. 12 is a block diagram representing a hardware configuration of repeater 1200 implemented as repeaters 1200-1 and 1200-2.

Repeater 1200 includes an input port 1210, a multiplier 1220, an oscillator 1230, an up-converter 1240, and a transmitting portion 380. Input port 1210 is connected, for example, to network 1030.

Input port 1210 outputs a signal input from network 1030 to multiplier 1220. Oscillator 1230 generates the same frequency as the carrier frequency of the signal transmitted from transmitting apparatus 1100. The signal is output to multiplier 1220. Multiplier 1220 multiplies the signal Lqz(1) from input port 1210 by the carrier wave from oscillator 1230, and generates a signal that oscillates as a positioning signal. The signal is input to up-converter 1240. Up-converter 1240 converts the frequency of this signal to a high frequency, and outputs a high frequency signal to transmitting portion 380. Transmitting portion 380 enhances the output of the high frequency signal, and transmits the signal through antenna 390. This signal corresponds to signals Lqz(11) and Lqz(12) shown in FIG. 10.

Figure 13:
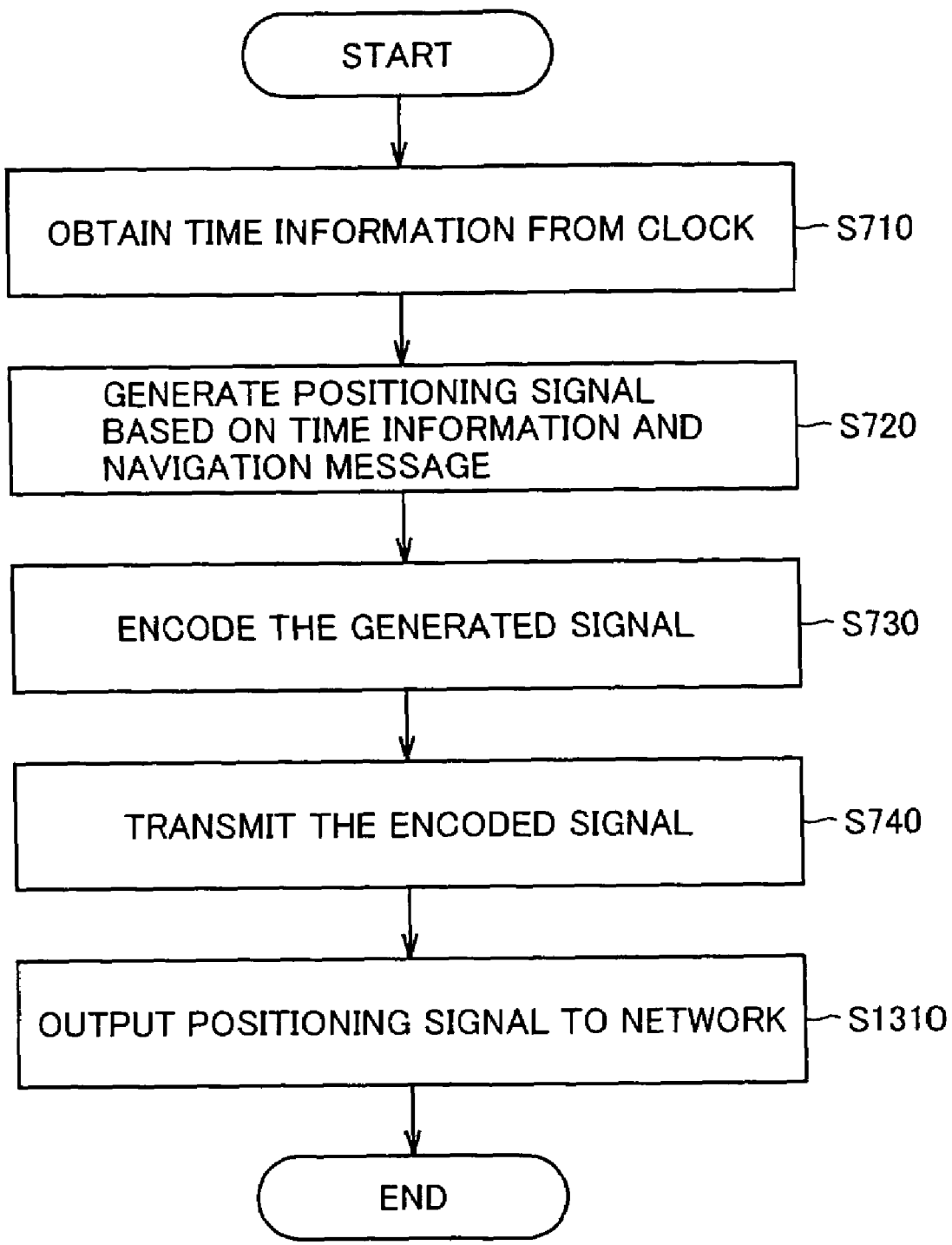
FIG. 13 is a flow chart representing process steps executed by transmitting apparatus 1100 in accordance with the second embodiment of the present invention.

Referring to FIG. 13, a control structure of transmitting apparatus 1100 in accordance with the present embodiment will be described. FIG. 13 is a flow chart representing process steps executed by transmitting apparatus 1100. Process steps that are the same as those of the first embodiment are denoted by the same step numbers, and description thereof will not be repeated.

In step S 1310, output port 1110 of transmitting apparatus 1100 outputs the positioning signal received from signal generating circuit 210 to network 1030. The manner of communication here is packet communication, though the manner is not limited thereto.

Figure 14:
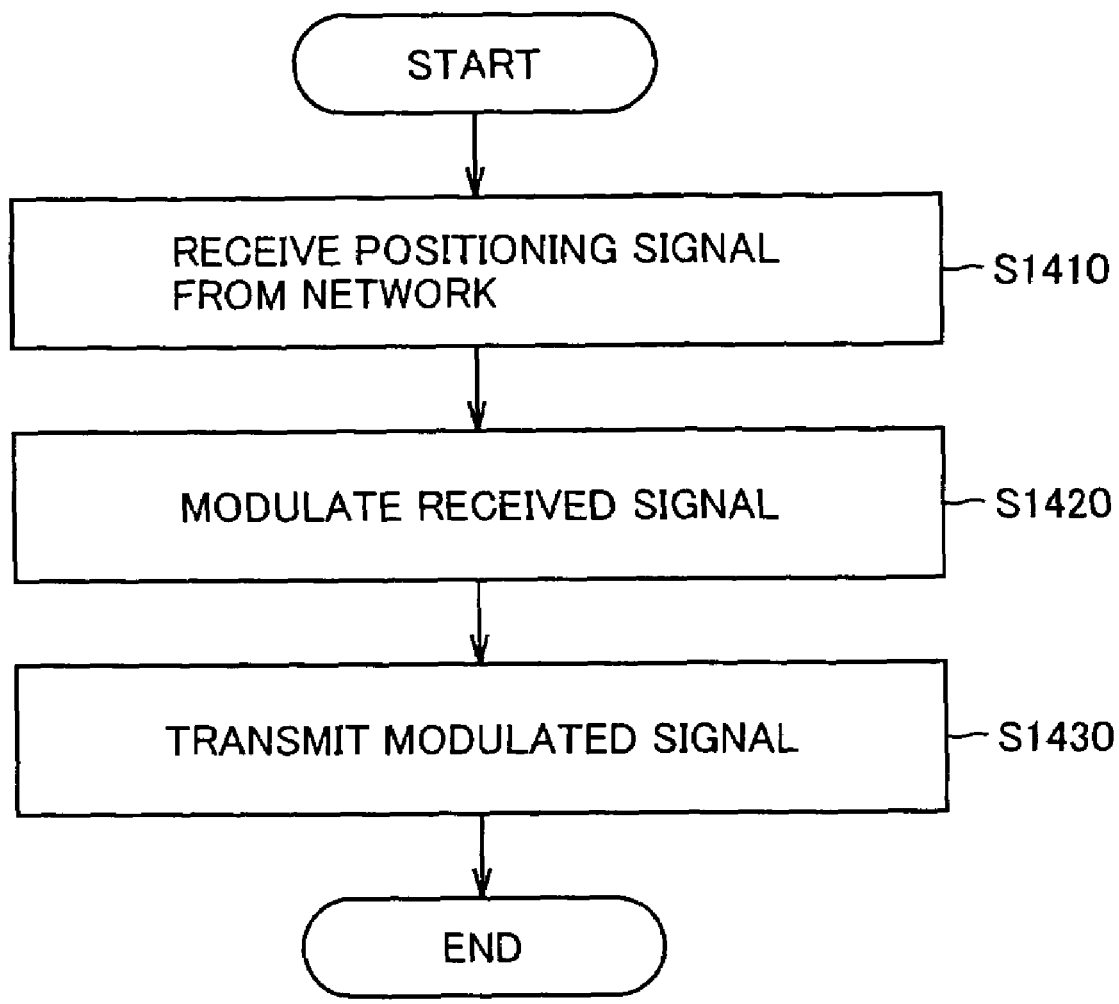
FIG. 14 is a flow chart representing process steps executed by a repeater constituting the system in accordance with the second embodiment of the present invention.

Referring to FIG. 14, control structures of repeaters 1200-1 and 1200-2 constituting the system of the present embodiment will be described. FIG. 14 is a flow chart representing process steps executed by each repeater for transmitting signals. In the following, the process will be described as executed by repeater 1200.

In step S1410, repeater 1200 receives positioning signal Lqz(1) from network 1030. In step S1420, repeater 1200 modulates, in multiplier 1220, the received signal. In step 1430, repeater 1200 transmits the modulated signals (Lqz (11), Lqz(12)).

Thereafter, when the transmitted signal is received by GPS receiver 400, GPS receiver 400 executes a process for calculating the positional information, and the position of the receiver itself is specified, as described in the first embodiment (FIG. 4).

As described above, in the system in accordance with the second embodiment of the present invention, the signal transmitted from transmitting apparatus 1100 sending the positional signal is directly received as a radio wave by GPS receiver 400. The signal is also transmitted through network 1030 to repeaters 1200-1 and 1200-2. Each repeater outputs the signal. Thus, GPS receiver 400 can receive signals provided from at least three portions. These signals have the same time information. As the transmitting apparatus 1100 and repeaters 1200-1 and 1200-2 are placed beforehand on buildings 1000, 1010 and 1020, respectively, positional relation therebetween is known. The data representing the positional relation may be stored in advance in GPS receiver 400, or may be contained in the signal from transmitting apparatus 1100.

Receiving the positioning signals, GPS receiver 400 executes the process for calculating the information representing position, based on these signals. GPS receiver 400 can specify sources of transmission based on the data representing the positional relation between the sources of transmission. Thus, GPS receiver 400 can readily specify the position of itself In the system in accordance with the present embodiment, transmitting apparatus 1100 and repeaters 1200-1 and 1200-2 are connected by network 1030. The manner of connection, however, is not limited and, by way of example, repeaters 1200-1 and 1200-2 may have a function of receiving radio waves. In that case, wireless connection is established between each of transmitting apparatus 1100 and repeaters 1200-1 and 1200-2. Specifically, as in the first embodiment, repeaters 1200-1 and 1200-2 can relay radio waves. This eliminates engineering works to-provide network 1030, and hence, the system for transmitting positioning signals can be formed quickly. Further, physical restriction related to the location of installing network and the like can be eased, and hence, flexible implementation of the system becomes possible. As a result, it becomes possible to provide positional information over a wide range to the user of GPS receiver 400.

Although the present invention has been described and illustrated in detail, it is clearly understood that the same is by way of illustration and example only and is not to be taken by way of limitation, the spirit and scope of the present invention being limited only by the terms of the appended claims.

The present invention is, when implemented in space, applicable to a system including a plurality of artificial satellites having an apparatus transmitting a signal for positioning and an apparatus for sending the signal. The present invention is, when implemented on the ground, applicable to a system including a plurality of repeaters connected to a communication network such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system for transmitting a positioning signal to a receiving apparatus configured to receive the positioning signal for positioning the receiving apparatus, the system comprising:
   one transmitting apparatus configured to transmit the positioning signal;
   a plurality of relay apparatuses configured to relay the positioning signal; and
   a supplying portion configured to supply data specifying a positional relation between the transmitting apparatus and each of the plurality of relay apparatuses to the receiving apparatus;
   wherein said transmitting apparatus includes:
   a time keeping portion keeping time,
   a storing portion storing data as an object to be encoded,
   a generating portion configured to generate the positioning signal containing the time, by encoding data stored in the storing portion, using a code for identifying a transmission apparatus of the positioning signal, and
   a transmitting portion configured to transmit the positioning signal generated by the generating portion;
   wherein each of the plurality of relay apparatuses includes a receiving portion configured to receive the positioning signal transmitted from the transmitting apparatus, and a transmitting portion configured to transmit the positioning signal received by the receiving portion; and
   wherein the system comprises no more than one clock.

2. The system according to claim 1, wherein said supplying portion includes an output portion configured to output said data specifying the positional relation to said generating portion.

3. The system according to claim 1, wherein said supplying portion includes a transmitting portion configured to transmit said data specifying the positional relation through a path different from a communication path of said transmitting apparatus.

4. The system according to claim 1, wherein said transmitting apparatus and each of said plurality of relay apparatuses are mounted on each of a plurality of artificial satellites.

5. The system according to claim 4, wherein at least one of said plurality of artificial satellites stays space above a predetermined region.

6. The system according to claim 4, wherein each of said artificial satellites navigates maintaining a predetermined positional relation between each of said plurality of artificial satellites.

7. The system according to claim 4, wherein said generation portion generates said positioning signal by encoding using a code for identifying an artificial satellite on which said transmitting apparatus is mounted.

8. The system according to claim 1, wherein said time keeping portion is an atomic clock.

9. The system according to claim 1, wherein the transmitting portion of said transmitting apparatus transmits said positioning signal by wireless, and the receiving portion of said relay apparatus receives said positioning signal by wireless.

10. The system according to claim 1, wherein the generating portion of said transmitting apparatus generates said positioning signal by encoding based on spread spectrum system.

11. The system according to claim 10, wherein said signal generated by encoding has a period between one millisecond and one week.

12. The system according to claim 11, wherein said signal generated by encoding has a period between one second and one hour.

13. The system according to claim 12, wherein said signal generated by encoding has a period of at least one minute and within a predetermined tolerable range.

14. The system according to claim 1, wherein the transmitting portion of said relay apparatus transmits said positioning signal without changing contents of the signal received by said receiving portion.

15. The system according to claim 1, wherein said transmitting apparatus further includes a receiving portion configured to receive input of data as an object to be encoded.

16. The system according to claim 1, wherein said data as an object to be encoded includes data for specifying position of said transmitting apparatus.

* * * * *

UNITED STATES PATENT AND TRADEMARK OFFICE
CERTIFICATE OF CORRECTION

| | |
|---|---|
| PATENT NO. | : 7,411,550 B2 |
| APPLICATION NO. | : 11/480797 |
| DATED | : August 12, 2008 |
| INVENTOR(S) | : Hideyuki Torimoto et al. |

It is certified that error appears in the above-identified patent and that said Letters Patent is hereby corrected as shown below:

On the Title Page, section (73) Assignee, in addition to the current assignee listed, "Funai Electric Co., Ltd." please add the name of the second assignee --GNSS Technologies Inc.--.

Signed and Sealed this

Tenth Day of February, 2009

JOHN DOLL
*Acting Director of the United States Patent and Trademark Office*